United States Patent
Minninger

(10) Patent No.: US 6,993,717 B2
(45) Date of Patent: Jan. 31, 2006

(54) DATA TRANSFORMATION SYSTEM

(75) Inventor: Michele C. Minninger, Spring City, PA (US)

(73) Assignee: Siemens Medical Solutions Health Services Inc., Malvern, PA (US)

( * ) Notice: Subject to any disclaimer, the term of this patent is extended or adjusted under 35 U.S.C. 154(b) by 799 days.

(21) Appl. No.: 10/074,946

(22) Filed: Feb. 12, 2002

(65) Prior Publication Data

US 2004/0205611 A1    Oct. 14, 2004

(51) Int. Cl.
*G06F 17/00* (2006.01)

(52) U.S. Cl. ....................... 715/523; 707/102
(58) Field of Classification Search ................ 715/523; 707/102, 200; 709/217, 246; 710/73; 717/136, 717/137

See application file for complete search history.

(56) References Cited

U.S. PATENT DOCUMENTS

| | | | | |
|---|---|---|---|---|
| 5,119,465 A | * | 6/1992 | Jack et al. ................... | 717/137 |
| 5,627,972 A | * | 5/1997 | Shear ......................... | 709/246 |
| 5,694,578 A | * | 12/1997 | Upson et al. ................. | 710/73 |
| 5,911,776 A | * | 6/1999 | Guck .......................... | 709/217 |
| 6,085,203 A | * | 7/2000 | Ahlers et al. ................ | 715/523 |
| 6,134,515 A | | 10/2000 | Skogby ........................ | 703/23 |
| 6,138,183 A | | 10/2000 | Tien et al. .................... | 710/22 |
| 6,151,702 A | * | 11/2000 | Overturf et al. ............. | 717/136 |
| 6,152,612 A | | 11/2000 | Liao et al. ................... | 395/500 |
| 6,195,664 B1 | * | 2/2001 | Tolfa .......................... | 707/200 |
| 6,728,950 B2 | * | 4/2004 | Davis et al. ................. | 717/136 |
| 6,792,431 B2 | * | 9/2004 | Tamboli et al. ............. | 707/102 |

* cited by examiner

*Primary Examiner*—Sanjiv Shah
(74) *Attorney, Agent, or Firm*—Alexander J. Burke

(57) ABSTRACT

The present invention provides a system and a method for software conversions which maps and translates data from model reports to files formatted as either Comma Separated Value (CSV) files or Flat Fixed Position files in order to migrate the data from one software systems' service to a similar service of a different software system. Using a report generated from the current system and a translation tool the data is mapped and translated to the receiving systems' conversion format. By developing standard reports and pre-defined translation templates data from one system's application can be converted easily, repeatedly and efficiently.

22 Claims, 2 Drawing Sheets

DATA TRANSFORMATION SYSTEM

BACKGROUND OF THE INVENTION

1. Field of the Invention

The present invention provides a system and a method for transforming data of a first data structure to a different second data structure that is compatible with an executable application. In particular the present invention relates to a system and method for software conversions which maps and translates data from model reports to files formatted as either Comma Separated Value (CSV) files or Flat Fixed Position files in order to migrate the data from one software systems' service to a similar service of a different software system. Using a report generated from the current system and a translation tool the data is mapped and translated to the receiving systems' conversion format. By developing standard reports and pre-defined translation templates data from one system's application can be converted easily, repeatedly and efficiently.

The function of the present invention is to map and translate data from one system to another in a way that allows for the system to be delivered and executed uniformly but easily customized and that allows customers to obtain their data inexpensively and repeatedly.

2. The Related Prior Art

Prior conversion methods required development efforts that were inherently ridged, expensive, and labor intensive. There are multiple ways that prior conversions were performed. Two are listed here:

One method used a COBOL program to translate and map the data from the current system to another system. This method was undesirable because every customer needed their own COBOL program and any modifications in mapping or translation needed by the customer required COBOL programming modifications.

Another method used COBOL programs to load the data to be converted into a tape file. The tape file was then loaded into a spreadsheet for mapping and translation. This method posed problems do to the intervention and resulting cost needed to create the tape file and the limitations and inadequacies of the spreadsheet's ability to map and translate data.

SUMMARY OF THE INVENTION

The present invention overcomes the aforementioned drawbacks of the prior art proposals by providing a system and a method for software conversions which maps and translates data from model reports to files formatted as either-Comma Separated Value (CSV) files or Flat Fixed Position files in order to migrate the data from one software systems' service to a similar service of a different software system. Using a report generated from the current system and a translation tool the data is mapped and translated to the receiving systems' conversion format. By developing standard reports and pre-defined translation templates data from one system's application can be converted easily, repeatedly and efficiently. The current systems data can be obtained through standard report procedures, which is cost effective and easily repeated. The mapping is standardized which decreases implementation time. The translation is easily accomplished. The cost to the customer is reduced while the time to completion is also reduced.

DETAILED DESCRIPTION OF THE PREFERRED EMBODIMENT

Figure 1:
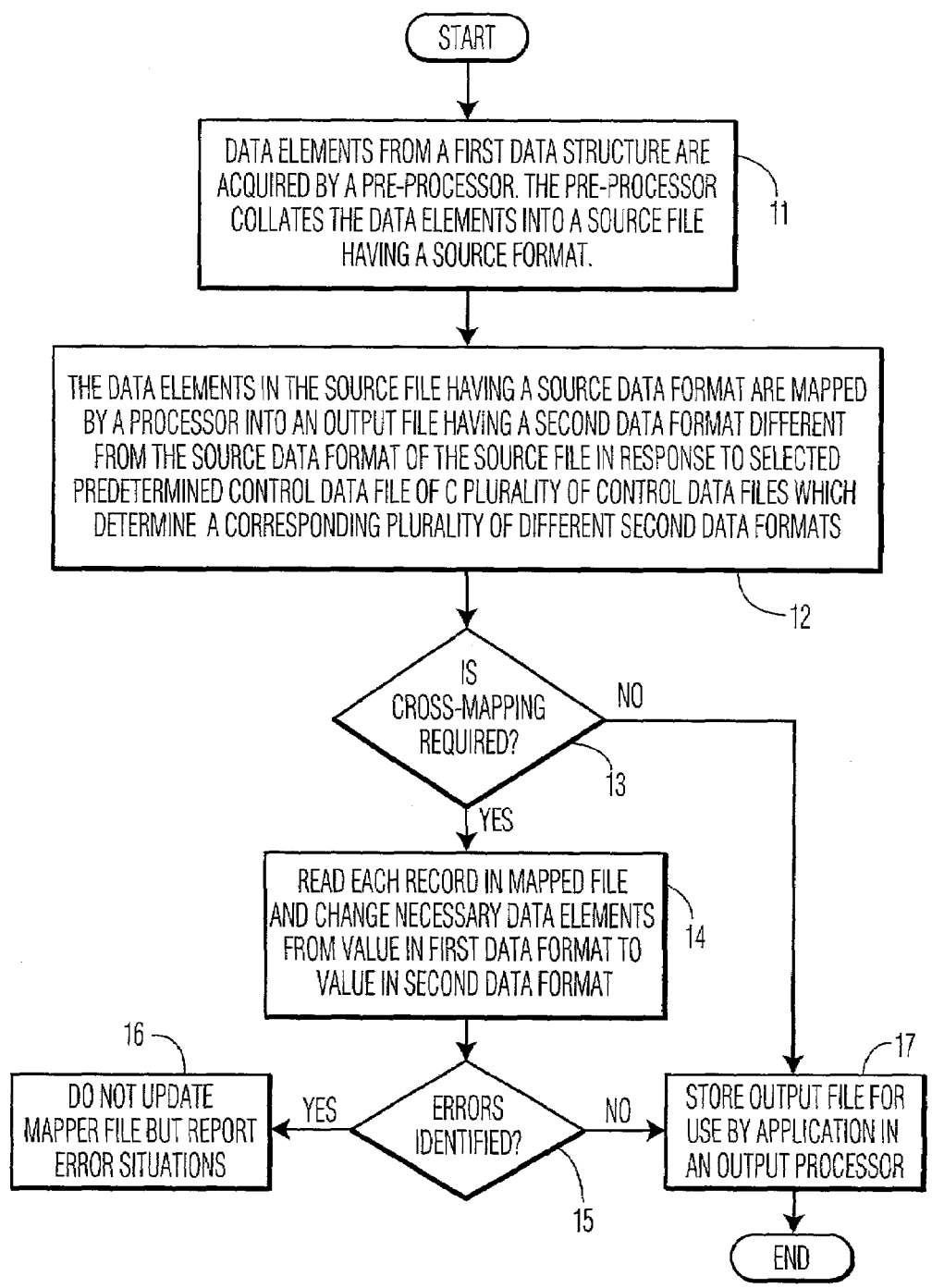
FIG. 1 is a general flow chart of the present invention.

Referring to the drawings and in particular FIG. 1 which shows a flow chart illustrating the method and system of the present invention in which data elements from a first data structure are acquired by a preprocessor. The preprocessor collates the data elements into a source file having a source format (step 11).

The first data structure has the ability to be accessed by random key and is given a specific name in the system. The data elements within the structure are identified by column, length, and type (text, money, integer, date, decimal) and given specific element names. These identifications are housed and maintained by the system. The system can maintain multiple first data structures and elements where the layouts are different. To create the second data structure, the necessary pre-defined data elements are selected and given an order and spacing output format by the preprocessor. The records to be extracted have the option to be determined by data element criteria. For example, one can generate the output for all records where the data element named VENDOR has a value between 0 and 9000. A specific name is given to the output format and its associated extraction criteria. The system houses and maintains multiple output specifications for each defined data structure. At any given time, the user can request the generation of the second data structure based on the content of the current first data structure and selected output format specification.

Step 12 of FIG. 1 describes how the data elements in the source file are mapped by a processor into an output file having a second data format. As noted in step 12 this mapping occurs in response to a selected predetermined control data file of a plurality of control data files that determine a corresponding plurality of different second data formats.

Figure 2:
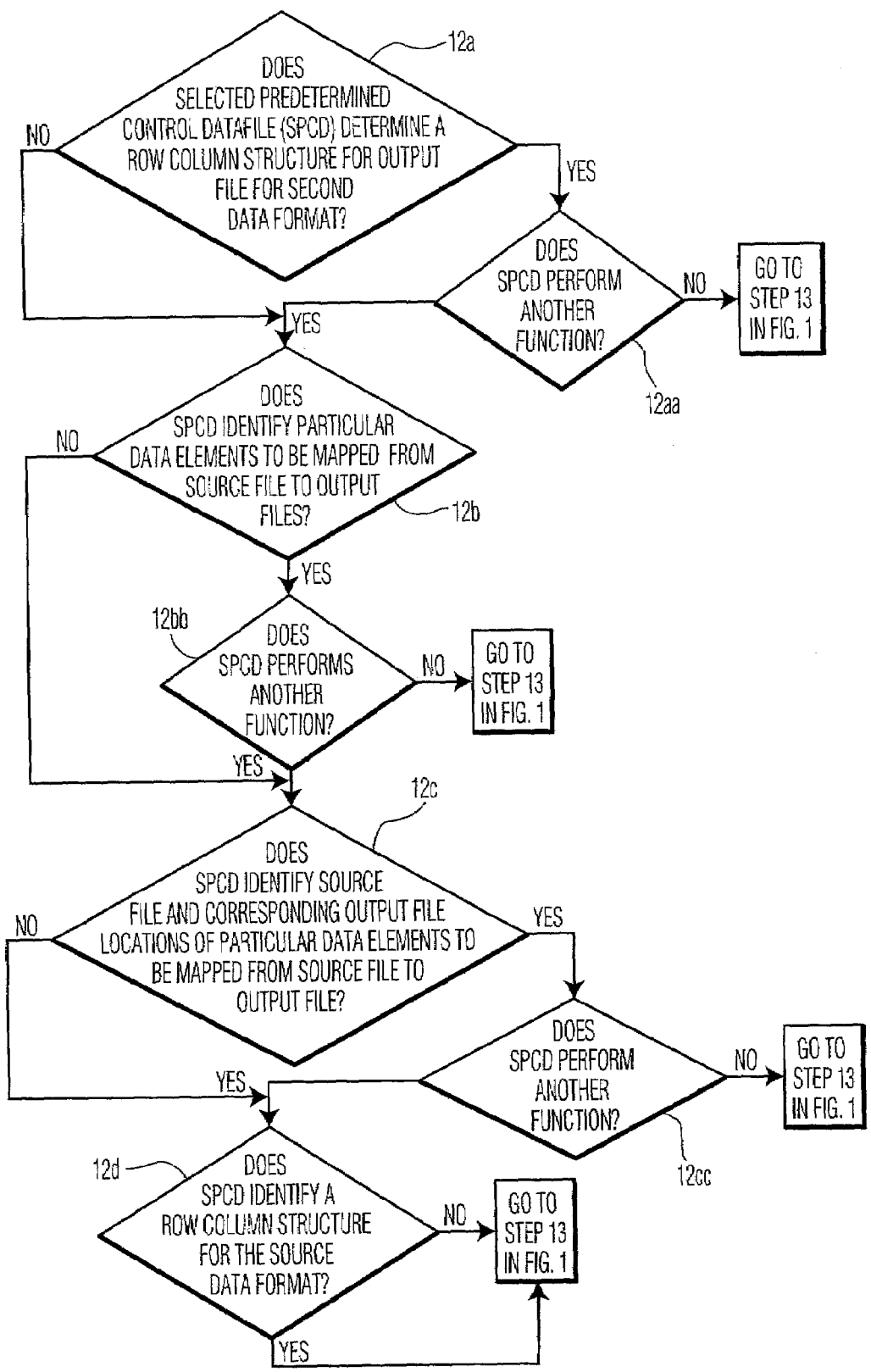
FIG. 2 is detailed flow chart illustrating step 12 of FIG. 1.

The second data structure is in either flat file or text format. The second data structure is accessed and the section of repeating data is identified. For example, if seven lines of data represent a Vendor, then seven lines containing vendor data would be selected. Within the selected group, data elements would be identified as those needed in the mapping. Each element to be mapped is identified by row, column, and length and given a name. In addition, the data element(s) that uniquely identifies a repeating group is/are identified. The system is then able to identify by name the data elements for each repeating group with in the second data structure. The Predetermined Control Data File contains these data element identifications and repeating group criteria. In addition, the mapping specifications for the output file are defined and kept in the Predetermined Control Data File. The mapping specifications contain the following data: field name, field length, field type, and field value. The field value can be a hard coded value, a data element from the repeating group, or instructions for deriving the field value. A derived field would use system-defined functions to manipulate the data. System functions would include, but not be limited to, arithmetic instructions, absolute value, Boolean expressions, If then expressions, address parsing, name parsing, data justification, and date reformatting. The Predetermined Control Data File is independent of the actual data in the second data structure, but is dependent on the second data structure format. When requested, the system will apply the Predetermined Control Data File against the contents of the current second data structure and produce a mapped output file. FIG. 2 illustrates step 12 of FIG. 1 in detail. As can be seen, a number of determinations about the Predetermined Control Data File have to be made, such as identifying a row column structure (step 12a), identifying particular data elements to be mapped (12aa), identifying source file and corresponding output file locations of particular data elements to be mapped from the source file to the output file (12c) and identifying a row column structure for the source data format (step 12d).

Step 13 of FIG. 1 relates to the feature of cross mapping. Sometimes the data elements from the first data format cannot be converted by the processor into the second data file format. In such cases the data elements are retained and cross mapping is done. The mapped output file is used as input along with an "old-new" file. The "old-new" file is any data structure that contains the necessary data element(s) and the value it is in the old format—the first data format and the value it should be in the new format—the second data format. The system will read each record in the mapped file and change the necessary data element(s) from the "old" value to the "new" value found in the "old-new" file (step 14). Possible errors are tracked (see step 15 of FIG. 1). For example if the value in the mapped file does not exist as an old value in the "old-new" file. If errors are identified, the mapped file will not be updated, but the system reports the error situations (see step 16 of FIG. 1). If no errors are identified, then the system updates the values in the mapped file and reports the changes (see step 17 of FIG. 1).

The following example will provide an illustration of the present invention's method and system in operation:

The users want to convert from a first system having a Vendor Master file and Invoice Master file data to a second system having a financial system. The second system has separate Vendor and Invoice data files. The first system's file layouts are predefined, as are the second system's file layouts. The first system's Vendor Master file is defined in the pre-processor system with the following data elements assignments:

CUSTOMER NUMBER, length 4, positions 1–4, type numeric;

VENDOR NUMBER, length 7, positions 5–11, type numeric;

VENDOR TYPE, length, 6, position 12–17, type alphabetic;

VENDOR NAME, length 30, positions 18–47, type alphanumeric; and

REMITTANCE ADDRESS, length 80, positions 48–127, type alphanumeric;

An output assignment called VENDOR LIST is created. VENDOR LIST is defined to generate output for all records. The text output will be generated in the following three-line format:

VENDOR NUMBER line 1 positions 1–7
VENDOR TYPE line 1 positions 8–13
VENDOR NAME line 2, positions 1–30
REMITTANCE ADDRESS line 3, positions 1–80

The first system's Invoice Master file is defined in the pre-processor's system with the following data elements assignments:

CUSTOMER NUMBER, length 4, positions 1–4, type numeric;

VENDOR NUMBER, length 7, positions 5–11, type numeric;

INVOICE NUMBER, length 10, positions 12–21, type alphanumeric;

INVOICE TYPE, length, 6, position 22–27, type alphabetic;

INVOICE AMOUNT, length 10, positions 28–37, type money;

INVOICE DATE, length 8, positions 38–45, type date mmddccyy; and

DESCRIPTION, length 20, positions 46–65, type alphanumeric.

An output assignment called INVOICE LIST is created. INVOICE LIST is defined to generate output for all records with an INVOICE TYPE of "ACTIVE". The text output will be generated in the following two-line format:

VENDOR NUMBER line 1 positions 1–7
INVOICE NUMBER line 1 positions 8–17
VENDOR TYPE line 1 positions 18–23
INVOICE DESCRIPTION line 2, positions 1–20
INVOICE DATE line 2, positions 21–28
INVOICE AMOUNT line 2, positions 29–38

The VENDOR LIST output is accessed by the generic Mapping system. A Control Data file called, VENDOR CONTROL is setup to recognize that three lines represent one vendor and to identify the data element layout of VENDOR LIST. Next the Control Data file is updated to include the mapped output file layout as follows in Table 1:

TABLE 1

| POSITIONS | NAME | TYPE | ELEMENT VALUE |
| --- | --- | --- | --- |
| 1–4 | Company | Numeric | "1234" |
| 5–14 | Vendor | Numeric | Sequential starting at 1000 incrementing by 1. |
| 15–44 | Vendor Name | Alphanumeric | Equal to VENDOR NAME on VENDOR LIST |
| 45—45 | Vendor Status | Alphabetic | If VENDOR TYPE on VENDOR LIST is equal to "active", then "A". If VENDOR TYPE is equal to "inactive", then "I". |

The VENDOR LIST output is accessed by the present invention's Mapping system. Another Control Data file called, CROSS FILE CONTROL is setup to recognize that three lines represent one vendor and to identify the data element layout of VENDOR LIST. Next the CROSS FILE CONTROL Control Data file is updated to include the mapped output file layout as follows in Table 2:

TABLE 2

| POSITIONS | NAME | TYPE | ELEMENT VALUE |
| --- | --- | --- | --- |
| 1–4 | Company | Numeric | "1234" |
| 5–11 | Old Vendor | Numeric | Equal to VENDOR NUMBER on VENDOR LIST |
| 12–21 | New Vendor | Numeric | Sequential starting at 1000 incrementing by 1. |

The INVOICE LIST output is accessed by the present invention's Mapping system. A Control Data file called, INVOICE CONTROL is setup to recognize that two lines represent one invoice and to identify the data element layout of INVOICE LIST. Next the Control Data file, INVOICE CONTROL is updated to include the mapped output file layout as follows in Table 3:

TABLE 3

| POSITIONS | NAME | TYPE | ELEMENT VALUE |
|---|---|---|---|
| 1–4 | Company | Numeric | "1234" |
| 5–14 | Vendor Number | Numeric | Equal to VENDOR NUMBER on INVOICE-LIST |
| 15–24 | Invoice number | Alphanumeric | Equal to INVOICE NUMBER on INVOICE LIST |
| 25–44 | Description | Alphabetic | Equal to INVOICE DESCRIPTION on INVOICE LIST |
| 45–50 | Date | MMDDYY | Equal to INVOICE DATE on INVOICE LIST |
| 51–60 | AMOUNT | MONEY | Equal to INVOICE AMOUNT on INVOICE LIST |

The Mapping system will extract data from the VENDOR LIST using the VENDOR CONTROL and call it MAPPED VENDORS.

The Mapping system will extract data from the VENDOR LIST using the CROSS FILE CONTROL and call it CROSSFILE MAP.

The Mapping system will extract data from the INVOICE LIST using the INVOICE CONTROL and call it MAPPED INVOICES.

The Cross File Mapping system will access each record in MAPPED INVOICES. It will look for a match between the invoice number and the old invoice value on the CROSSFILE MAP. If all MAPPED INVOICE invoice numbers have corresponding CROSSFILE MAP old invoice numbers, the system will change the MAPPED INVOICES invoice numbers to be equal to the corresponding CROSSFILE MAP new invoice numbers. If a MAPPED INVOICES invoice number does not exit as a CROSSFILE MAP old invoice number, no changes are made and an error report is generated.

Assuming that the cross file mapping was successful, MAPPED VENDORS and MAPPED INVOICES are now available for input in to the second system's financial system.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system for transforming data of a first data structure to a different second data structure compatible with an executable application, comprising:
   a pre-processor for acquiring data element values from a first data structure and collating said acquired data element values into a source file having a source data format;
   a mapping processor for automatically mapping data element values in said source file having said source data format into an output file having a different second data format in response to a selected one of a plurality of predetermined control data files determining a corresponding plurality of different second data formats, said mapping processor automatically mapping data element values in said source file into an output file by using selected predetermined individual control data file to identify an output file data element value corresponding to a source file data element value and to map said source file data element value in said source data format to said identified corresponding output file data element value in said second data format without user intervention; and
   an output processor for storing said output file for use by said application.

2. The system according to claim 1, wherein said selected predetermined control data file does at least one of, (a) determine a row column structure for said output file second data format, b) identify source file and corresponding output file locations of particular data element values to be mapped from said source file to said output file, and (c) identify a row column structure for said source file data format.

3. The system according to claim 1, wherein said pre-processor acquires a control data element value of said individual control data file from said first data structure and provides said control data element value to said selected predetermined control data file.

4. The system according to claim 1, wherein said pre-processor parses data element values of said first data structure to include some element values in said source file and to exclude other element values from said source file in response to user entered data element value selection information.

5. The system, according to claim 1, wherein said predetermined individual control data file includes an indicator identifying repeating data elements associated with a common entity and
said mapping processor uses said indicator in mapping said source file data element value in said source data format to said identified corresponding output file data element value in said second data format.

6. The system according to claim 1, wherein said selected control data file includes user entered information for directing said mapping of data element values in said source file to said output file, and said mapping processor acquires said user entered information in response to prompting user data entry.

7. The system according to claim 1, wherein said plurality of predetermined control data files represent a plurality of predetermined mapping templates for automatically identifying output file data element values corresponding to source file data element values and for mapping said source file data element values in a selected one of a plurality of corresponding different source data formats to said identified corresponding output file data element values in a selected one of a plurality of corresponding different second data formats, without user intervention.

8. The system according to claim 1, wherein said output file second data format comprises at least one of, (a) a comma separated file (CSF) or Flat file format, and (b) a data field size aligned file format.

9. The system according to claim 1 further comprising a cross mapping processor for reading individual records including said mapped data element values and converting necessary data element values from said first data format into said second data format before outputting said second data format file to said output processor.

10. The system according to claim 9 wherein
before outputting said second data format file said cross mapping processor identifies errors in said necessary data element values and reports errors instead of outputting to said output processor.

11. A method for transforming data of a first data structure to a different second data structure compatible with an executable application, the activities of:
acquiring data element values from a first data structure and collating said acquired data element values into a source file having a source data format;
automatically mapping data element values in said source file having said source data format into an output file having a different second data format in response to a selected one of a plurality of predetermined control data files determining a corresponding plurality of different second data formats, by automatically mapping data element values in said source file into an output file by using a selected predetermined individual control data file to identify an output file data element value corresponding to a source file data element value and to map said source file data element value in said source data format to said identified corresponding output file data element value in said second data format without user intervention; and
storing said output file for use by said application by an output processor.

12. The method according to claim 11, wherein
said selected predetermined control data file does at least one of, (a) determine a row column structure for said output file second data format, b) identify source file and corresponding output file locations of particular data element values to be mapped from said source file to said output file, and (c) identify a row column structure for said source file data format.

13. The method according to claim 11, including the activity of
acquiring a control data element from said first data structure and providing said control data element to said selected predetermined control data file.

14. The method according to claim 11, including the activity of
parsing data element values of said first data structure to include some element values in said source file and to exclude other element values from said source file in response to user entered data element selection information.

15. The method, according to claim 11, wherein
said predetermined individual control data file includes an indicator identifying repeating data elements associated with a common entity and
including the activity of
employing said indicator in mapping said source file data element value in said source data format to said identified corresponding output file data element value in said second data format.

16. The method according to claim 15, wherein
said selected control data file includes user entered information for directing said mapping data element value in said source file to said output file, and including the activity of
acquiring said user entered information in response to prompting user data entry.

17. The method according to claim 11, wherein
said plurality of predetermined control data files represent a plurality of predetermined mapping templates for automatically identifying output file data element values corresponding to source file data element values and for mapping said source file data element values in a selected one of a plurality of corresponding different source data formats to identified corresponding output file data element values in a selected one of a plurality of corresponding different second data formats, without user intervention.

18. The method according to claim 11, wherein
said output file second data format comprises at least one of, (a) a comma separated file (CSF) or Flat file format, and (b) a data field size aligned file format.

19. The method according to claim 11 further comprising the activity of
parsing individual records including said mapped data element value and
converting a necessary data element value from said first data format into said second data format before outputting said second data format file to said output processor.

20. The method according to claim 19 including the activity of
before outputting said second data format file identifying any errors in said necessary data elements and reporting errors instead of outputting to said output processor.

21. A system for transforming data of a first data structure to a different second data structure compatible with an executable application, comprising:
a pre-processor for acquiring data element values from a first data structure and collating said acquired data elements into a source file having a source data format, said acquired data element values being for processing by an executable application;
a mapping processor for automatically mapping data element values in said source file having said source data format into an output file having a different second data format in response to a selected one of a plurality of predetermined control data files determining a corresponding plurality of different second data formats, a predetermined individual control data file including an indicator identifying repeating data elements associated with a common entity wherein said mapping processor uses said indicator in mapping said source file data element values in said source data format to said identified corresponding output file data element values in said second data format without user intervention; and
an output processor for storing said output file for use by said application.

22. The system, according to claim 21, wherein
said mapping processor automatically maps data element values in said source file into an output file by using a selected predetermined individual control data file to identify an output file data element value corresponding to a source file data element value and to map said source file data element value in said source data format to said identified corresponding output file data element value in said second data format without user intervention.

* * * * *